No. 794,764.
PATENTED JULY 18, 1905.
P. M. WOLF.
PUMP PLATFORM.
APPLICATION FILED FEB. 13, 1905.
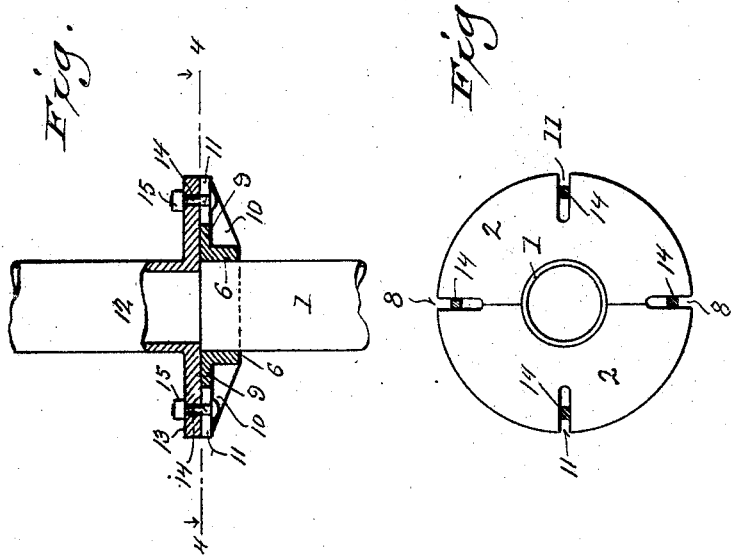
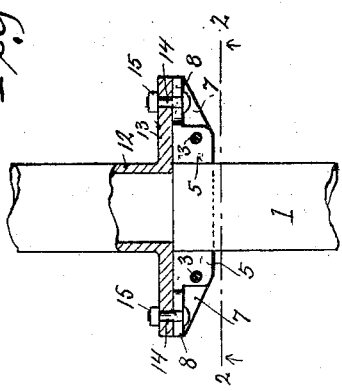
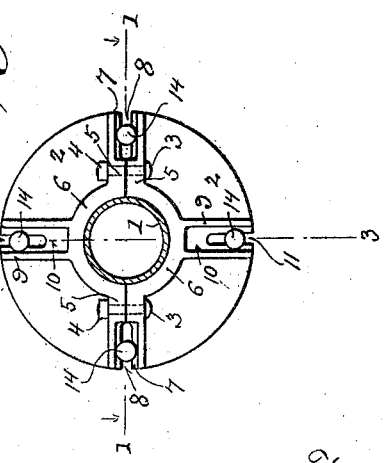
Witnesses
Geo. W. Young.
George Felter.
Inventor
Peter M. Wolf,
By H. G. Underwood
Attorneys No. 794,764. Patented July 18, 1905.

UNITED STATES PATENT OFFICE.

PETER M. WOLF, OF PLYMOUTH, WISCONSIN.

PUMP-PLATFORM.

SPECIFICATION forming part of Letters Patent No. 794,764, dated July 18, 1905.

Application filed February 13, 1905. Serial No. 245,436.

*To all whom it may concern:*

Be it known that I, PETER M. WOLF, a citizen of the United States, and a resident of Plymouth, in the county of Sheboygan and State of Wisconsin, have invented certain new and useful Improvements in Pump-Platforms; and I do hereby declare that the following is a full, clear, and exact description thereof.

My invention has especial reference to pump-platforms employed in connection with casings in wells; and it consists in certain peculiarities of construction and combination of parts, as will be fully set forth hereinafter in connection with the accompanying drawings and subsequently claimed.

In the said drawings, Figure 1 is a view showing my pump-platform secured to a well-casing and the lower part of a pump secured to said platform, partly in elevation and partly in section, on the line 1 1 in Fig. 2. Fig. 2 is an under side plan view, partly in section, on the line 2 2 in Fig. 1. Fig. 3 is a view, partly in elevation and partly in section, on the line 3 3 in Fig. 2. Fig. 4 is a plan view, partly in section, on the line 4 4 in Fig. 3.

Referring by numerals to the said drawings, 1 designates the well-casing, and 2 2 the two halves of my pump-platform clamped to the upper end of said casing by the bolts 3 3 and nuts 4 4, the said bolts passing through the extensions 5 5 of the semi-annular central flanges 6 6, which flanges come closely against the said casing 1 when the two halves of the platform are put together. The said extensions are recessed on the under side, as shown at 7, and cut away, so as to leave a central edge slot when the two halves are put together, as shown at 8. The said semi-annular central flanges 6 are provided with other extensions 9 at right angles to those just described, formed with under side recesses 10 and central edge slots 11, and after the two halves 2 2 of the platform have been put together and secured by the bolts 3 and nuts 4, as described, the upper surface is substantially a smooth flat disk with opposing edge slots 8 and 11 at regular distances apart, as shown in Fig. 4.

12 designates the lower part of a pump-body with a base-flange 13, which is designed to rest on the described pump-platform, this base-flange having a series of holes therethrough to receive the shanks of bolts 14, passed up through the slots 8 and 11, the heads of said bolts being received in the described recesses 7 and 10 and the screw-threaded ends of said bolts after passing through the holes in the base-flange 13 being fitted with nuts 15, thus firmly uniting the pump-base to the platform, this operation taking only a few minutes and the result being permanent and satisfactory.

Having thus described my invention, what I claim as new, and desire to secure by Letters Patent, is—

The combination with a well-casing, of a two-part platform each part having a semi-circular central opening, surrounded by semi-annular flanges, provided with recessed and slotted extensions, and bolts and nuts for clamping the said platform-halves to each other and to the well-casing, and for uniting the said platform to a pump-base superimposed thereon.

In testimony that I claim the foregoing I have hereunto set my hand, at Plymouth, in the county of Sheboygan and State of Wisconsin, in the presence of two witnesses.

PETER M. WOLF.

Witnesses:
H. J. ROONEY,
HENRY F. WOLF.